(12) United States Patent
Maligne et al.

(10) Patent No.: US 7,240,602 B2
(45) Date of Patent: Jul. 10, 2007

(54) BRAKE CONTROL DEVICE (75) Inventors: Jean-Charles Maligne, Aubervilliers (FR); Ulysse Verbo, Sant-Cugat-Espagne (FR); Philippe Richard, Chelles (FR)

(73) Assignee: Robert Bosch GmbH, Stuttgart (DE)

( * ) Notice: Subject to any disclaimer, the term of this patent is extended or adjusted under 35 U.S.C. 154(b) by 1 day.

(21) Appl. No.: 10/535,882

(22) PCT Filed: Nov. 14, 2003

(86) PCT No.: PCT/EP03/12749

§ 371 (c)(1), (2), (4) Date: Apr. 11, 2006

(87) PCT Pub. No.: WO2004/048178

PCT Pub. Date: Jun. 10, 2004

(65) Prior Publication Data

US 2006/0163938 A1 Jul. 27, 2006

(51) Int. Cl.
*F15B 9/10* (2006.01)
(52) U.S. Cl. .................................. 91/376 R
(58) Field of Classification Search ............... 91/369.2, 91/376 R
See application file for complete search history.

(56) References Cited

U.S. PATENT DOCUMENTS

| 5,263,399 | A | * | 11/1993 | Flory et al. ............... 91/376 R |
| 5,651,300 | A | | 7/1997 | Ikeda et al. |
| 5,857,399 | A | | 1/1999 | Tsubouchi et al. |
| 6,250,200 | B1 | | 6/2001 | Ikeda et al. |

* cited by examiner

Primary Examiner—F. Daniel Lopez
(74) Attorney, Agent, or Firm—Leo H. McCormick, Jr.; Sarah Taylor (57) ABSTRACT A device comprised a master cylinder driven by a control member (20), a pneumatic booster (14), a piston (22), first (VE1) and second (VE2) balancing valve elements, first (VA1) and second (VA2) intake valve elements, and a tubular support (44) provided with two parts (44A, 44B) move relative to one another to adjust the length of the support (44). The balancing valve elements (VE1, VE2) are borne by a balancing part (44B) of the support and the pneumatic piston (22). The intake valve elements (VA1, VA2) are borne by the control member (20) and an intake part (44A) of the support. The two parts (44B, 44A) of the support are connected to one another by a spring (54) and arm (56) arrangement for adjusting the separation thereof as a function of the power of the force applied to the control member (20).

17 Claims, 7 Drawing Sheets

BRAKE CONTROL DEVICE

The present invention relates to a booster and to a brake control device fitted with this booster.

BACKGROUND OF THE INVENTION

A pneumatic brake booster, of the type comprising:
an axially movable control member for controlling this booster and intended to receive a control force applied by a user,
a pneumatic enclosure containing two chambers, called a rear chamber and a front chamber, separated by a pneumatic piston, and
means forming pneumatic valves comprising:
   first and second complementary valve-forming elements for placing the rear chamber in communication with the front chamber, called first and second balancing valve elements, and
   first and second complementary valve-forming elements for placing the rear chamber in communication with a pneumatic pressure source, called first and second intake valve elements, is already known from the prior art.

The control member, also referred to as a plunger, is usually intended to transmit a braking force to a master cylinder control rod. The pneumatic piston is connected to the control rod.

A braking operation is controlled by the driver by means of a brake pedal connected to the control member.

The pressure in the master cylinder changes as a function of the force exerted on the brake pedal, called braking force, in the following way.

Initially, the braking force is intended to overcome the preload on a return spring which returns the control member to a rest position. The booster remains at rest. The pressure in the master cylinder remains constant.

As the braking force increases, the preload on the control member return spring is overcome and the booster is activated. Now, with the booster in its rest configuration, there is usually an axial clearance between the control member and the control rod. Consequently, activating the booster causes a pressure jump in the master cylinder, this occurring with a constant braking force, hence, on account of the axial clearance, the control member is not subjected to any reaction on the part of the master cylinder control rod.

SUMMARY OF THE INVENTION

It will therefore be appreciated that the greater the pressure jump in the master cylinder, the more rapidly effective the action on the brake pedal will be.

After cancelling the axial clearance, the pressure in the master cylinder increases proportionally to the braking force, first of all at a ratio corresponding to the boost ratio of the booster, and then, after boost saturation, at a ratio which is less than the preceding one.

A particular object of the invention is to provide a pneumatic brake booster of the aforementioned type which, during its operation, brings about a pressure jump in the master cylinder which is more pronounced in the event of emergency braking than in the event of normal braking.

To this end, the subject of the invention is a pneumatic brake booster of the aforementioned type, characterized in that the means forming valves comprise an axially floating tubular support provided with two parts which can move axially with respect to one another so as to adjust the length of this support, the first and second balancing valve elements being borne respectively by one of the parts of the support, called balancing part, and the pneumatic piston, the first and second intake valve elements being borne respectively by the control member and the other of the parts of the support, called intake part, the balancing and intake parts of the support being connected to one another by means for adjusting the axial separation thereof as a function of the power of the force applied to the control member.

According to features of various embodiments of this pneumatic brake booster:
   the axial separation adjustment means comprise:
      elastic return means urging the two parts of the support away from one another, and
      means with releasable axial bearing surfaces, comprising:
         complementary axial bearing surfaces borne by one of the parts of the support and a free end of at least one arm secured axially to the other of the parts of the support, and
         means for releasing the complementary axial bearing surfaces, borne by the control member, these release means engaging with the arm, against an elastic force returning this arm into a position of engagement between the complementary bearing surfaces, in order to radially separate the complementary bearing surfaces when the distance between the control member and the pneumatic piston is reduced beyond a predetermined threshold;
   the control member has a general shape of revolution, the means for releasing the complementary axial bearing surfaces comprising at least one finger projecting radially with respect to the contour of the control member;
   the release finger is intended to engage with a ramp for the radial separation of the arm, the size of this ramp being designed so that the radial separation of the complementary bearing surfaces, causing the release thereof, takes place only when the distance between the control member and the pneumatic piston is reduced beyond the predetermined threshold;
   the booster comprises at least three releasable arms and three release fingers distributed angularly around the support and the control member respectively;
   the arm is secured axially to the intake part of the support, the complementary axial bearing surfaces being borne by the arm and the balancing part of the support;
   the free end of the arm has a general hook shape forming an axial bearing stop intended to engage with a stepped complementary stop borne by the balancing part, this stepped stop forming two axially and radially offset bearing surfaces corresponding to two, respectively normal and elongated, lengths of the support;
   the arm is secured axially to the balancing part of the support, the complementary axial bearing surfaces being borne by the arm and the intake part of the support;
   the intake part of the support comprises an axial bearing stop intended to engage with a stepped complementary stop borne by the free end of the arm, this stepped stop forming two axially and radially offset bearing surfaces corresponding to two, respectively normal and elongated, lengths of the support;

the arm is returned into a position of engagement between the complementary bearing surfaces by an elastically deformable member engaging with this arm;

the arm is returned into a position of engagement between the complementary bearing surfaces by elastic deformation of this arm;

the booster comprises elastic return means urging the control member and the support away from one another in such a way as to return the support toward the piston and thus connect this support elastically to movements of the piston;

the booster comprises elastic return means urging the control member and the pneumatic piston away from one another, in such a way as to return the control member toward a rest position;

the booster comprises a feeler intended for the transmission of force between the control member and a master cylinder actuating rod, this feeler being inserted axially, on the one hand, between first and second bearing faces intended to be connected axially to the actuating rod, and, on the other hand, between the first bearing face intended to be connected to the actuating rod and a bearing face connected axially to the control member;

the first bearing face intended to be connected to the actuating rod delimits a reaction disk which is elastically deformable axially and intended to be connected axially to the actuating rod;

the second bearing face intended to be connected to the actuating rod delimits one end of a spacer sleeve borne by a member for axially guiding the control member, the bearing face connected axially to the control member delimiting a bearing ring housed within the bearing sleeve;

the pneumatic pressure source is atmospheric air.

Another subject of the invention is a brake control device, characterized in that it is driven by a booster as defined above.

A better understanding of the invention will be gained from reading the description which will follow, given solely by way of example and with reference to the drawings.

DETAILED DESCRIPTION OF THE INVENTION

FIGS. 1 to 4 represent a motor vehicle brake control device according to a first embodiment of the invention, denoted by the general reference 10.

In the text hereinbelow, an element of the kinematic chain connecting the driver to a brake of the vehicle will be called "rear element" when it is close to the driver in this kinematic chain and "front element" when it is close to the brake in this kinematic chain.

Figure 1:
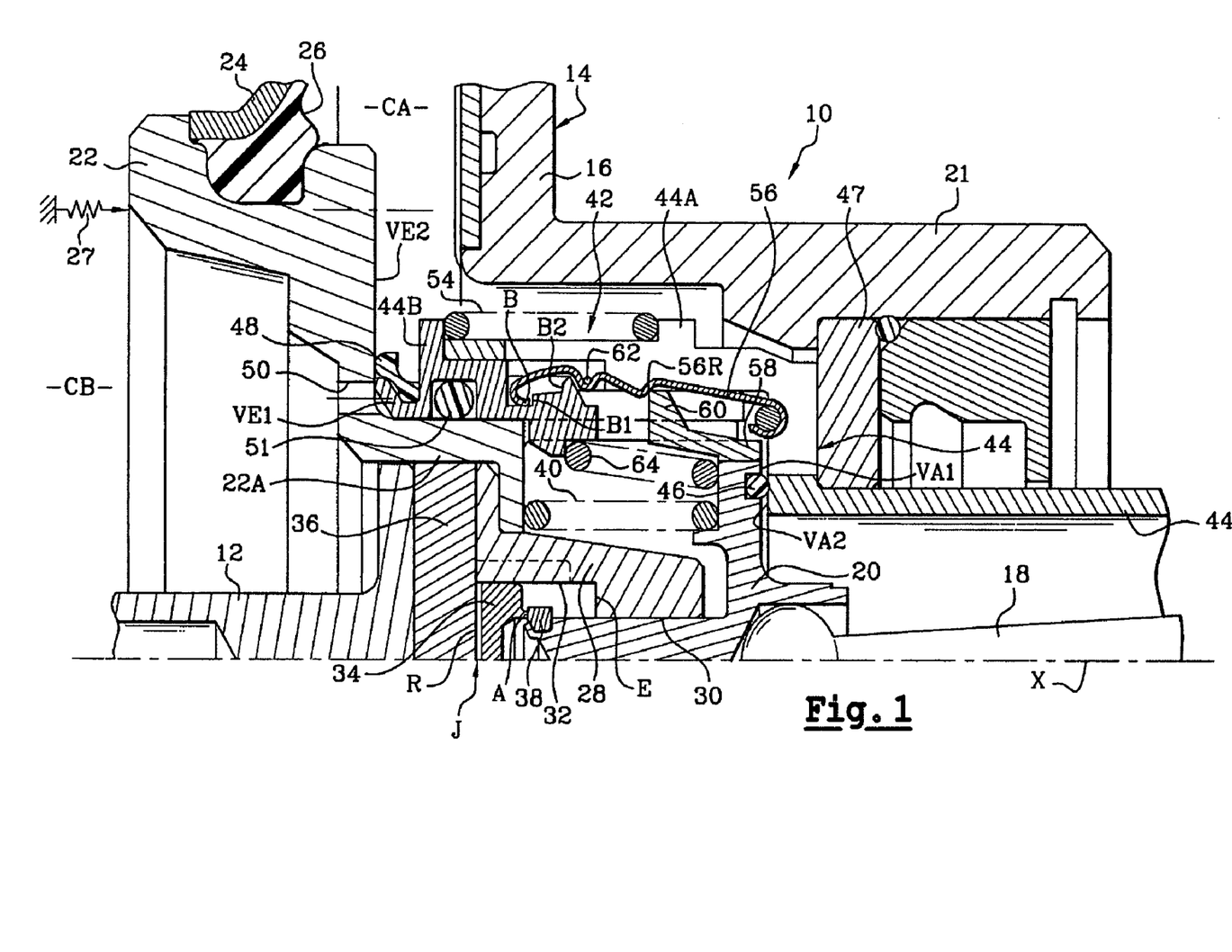
FIG. 1 is a view in axial section of a brake control device according to a first embodiment of the invention, this device being in a rest configuration.

The brake control device 10 comprises a rod 12 for actuating a conventional master cylinder.

The brake control device 10 also comprises a pneumatic brake booster 14 which is intended to drive the master cylinder and is provided with an enclosure 16 having a general shape of revolution about an axis X. This axis defines an axial direction.

The enclosure 16, which is generally housed in the engine compartment of the motor vehicle, is inserted axially between the master cylinder and a control rod 18 connected to a conventional brake control pedal (not shown). The control rod 18 is connected axially to a plunger 20 forming a moving control member intended to receive the control force applied to the brake pedal by the user. It will be noted that the plunger 20 has a general shape of revolution.

In the conventional way, the enclosure 16 comprises a first chamber, called rear chamber CA, which can be connected, via means housed in a rear tubular continuation 21 of the enclosure 16, to a pneumatic pressure source, for example atmospheric air as in the embodiment illustrated.

The enclosure 16 also comprises a second chamber, called front chamber CB, separated from the rear chamber CA by a moving assembly comprising a pneumatic piston 22 connected to a rigid skirt 24 and a flexible diaphragm 26. The front chamber CB can be connected to a vacuum source using conventional connection means. The moving assembly will be referred to hereinafter as piston assembly 22.

The piston assembly 22 is able to move in a substantially axial direction as a function of the pressure variations in at least one of the two chambers CA, CB. This pressure variation is what generates the boost force of the booster 14.

The piston assembly 22 is secured axially to the master cylinder actuating rod 12.

The piston assembly 22 is returned elastically toward a rest position, as represented in FIG. 1, corresponding to a minimum volume of the rear chamber CA, using conventional means 27 schematically illustrated in FIG. 1.

The plunger 20 is guided axially by means of a member 28 secured axially to the master cylinder actuating rod 12 and to the piston assembly 22. The guide member 28, which is generally annular in shape, has an internal supporting surface 30 engaging with the contour of the plunger 20 so as to guide it axially, and a recess 32 forming an internal cavity within the guide member 28.

A feeler 34, intended for the transmission of force between the plunger 20 and the actuating rod 12, is housed in the recess 32. This feeler 34, which can move axially in the recess 32, is inserted axially between a bearing face R, delimiting a reaction disk 36, and a shoulder E which separates the supporting surface 30 from the recess 32.

The reaction disk 36, which is elastically deformable axially, is inserted axially between the master cylinder actuating rod 12 and the guide member 28. The reaction disk 36 and its bearing face R are connected axially to the rod 12 and to the piston assembly 22.

The feeler 34 is also inserted axially between the bearing face R delimiting the reaction disk and a bearing face A delimiting a ring 38 connected axially to the plunger 20. The bearing ring 38, fitted onto the plunger 20, is secured axially to this plunger 20.

FIG. 1 represents the control device 10, particularly the booster 14, in a rest configuration. It will be noted that in this rest configuration there is an axial clearance J between the plunger 20 and the reaction disk 36. More specifically, since the feeler 34 bears against the ring 38, the clearance J extends axially between the feeler 34 and the reaction disk 36. The ring 38 is fitted onto the plunger 20. Precise adjustment of the clearance J may be achieved for example by swaging the end of the feeler 34.

When the brake pedal is suddenly released by the user, the ring 38 forms an axial stop engaging with the shoulder E of the guide member 28 so as to prevent the plunger 20 and the pneumatic piston 22 from separating.

A spring 40 working in compression bears, on the one hand, on a seat integral with the pneumatic piston 22 and, on the other hand, on a seat integral with the plunger 20. This spring 40 forms elastic return means urging the plunger 20 and the pneumatic piston 22 away from one another, in such a way as to return the plunger 20 toward a rest position.

According to a conventional operation of the booster 14, the rear chamber CA can be placed in selective communication with, on the one hand, the front chamber CB and, on the other hand, the pneumatic pressure source with the aid of means 42 forming pneumatic valves.

Figure 2:
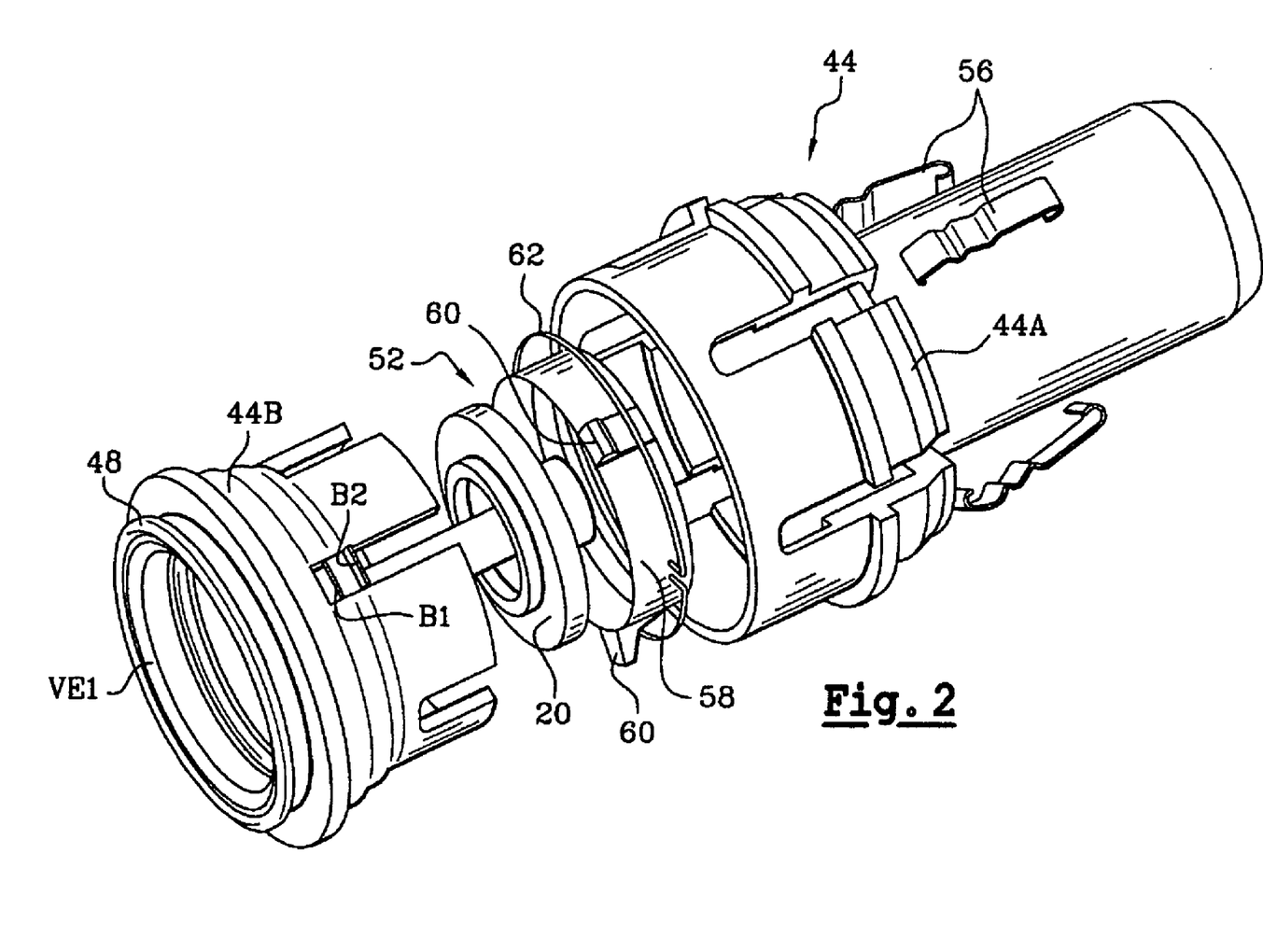
FIG. 2 is an exploded perspective view of the tubular support of the valve-forming means.

With reference to FIGS. 1 and 2, it can be seen that the means 42 forming valves comprise a tubular support 44 mounted in an axially floating manner in the rear continuation 21 of the enclosure 16. This support 44 is provided with two parts 44A, 44B which can move axially with respect to one another so as to adjust the length of this support 44.

The means 42 forming valves also comprise first VA1 and second VA2 complementary elements forming a valve for placing the rear chamber CA in communication with the pneumatic pressure source. These elements are referred to as first VA1 and second VA2 intake valve elements.

The first intake valve element VA1 is borne by the plunger 20. The second intake valve element VA2 is borne by the rear part 44A of the support, called intake part 44A.

In the example illustrated, the first intake valve element VA1 bears an O-ring seal 46 intended to engage with the second intake valve element VA2, forming a bearing seat for the O-ring seal 46.

As a variant, the arrangement of the seal 46 and of the seat on the intake valve elements could be reversed.

It will be noted that the intake part 44A of the support, this part being housed in the rear continuation 21 of the enclosure 16, forms a duct connecting the rear chamber CA to the pressure source, this being the case when the intake valve formed by the elements VA1, VA2 is open.

Conventional sealing and axial guide means 47, which are generally annular in shape, are inserted radially between the internal contour of the continuation 21 of the enclosure 16 and the external contour of the intake part 44A of the support.

The means 42 forming valves also comprise first VE1 and second VE2 complementary elements forming a valve for placing the rear chamber CA in communication with the front chamber CB. These elements are referred to as first VE1 and second VE2 balancing valve elements.

The first balancing valve element VE1 is borne by the front part 44B of the support, called balancing part 44B. The second balancing valve element VE2 is borne by the pneumatic piston 22.

In the example illustrated, the first balancing valve element VE1 bears an annular seal 48 intended to engage with the second balancing valve element VE2, forming a bearing seat for the seal 48.

The second balancing valve element VE2 is provided with a port 50 intended to place the front CA and rear CB chambers in communication with one another. The port 50 can be closed off by the first balancing valve element VE1.

As a variant, the arrangement of the seal 48 and of the seat on the balancing valve elements could be reversed.

The piston 22 comprises a rear annular continuation 22A forming axial guide means for the balancing part 44B of the support. This part 44B is in fact fitted around the continuation 22A. An O-ring seal 51 is inserted radially between the continuation 22A and the balancing part 44B.

The intake 44A and balancing 44B parts of the support are connected to one another by means 52 for adjusting the axial separation thereof as a function of the power of the force applied by the user to the plunger 20.

The axial separation adjustment means 52 comprise a spring 54, working in compression, bearing, on the one hand, on a seat integral with the intake part 44A of the support and, on the other hand, on a seat integral with the balancing part 44B of the support. This spring 54 forms elastic return means urging the two parts 44A, 44B of the support away from one another.

The axial separation adjustment means 52 also comprise means with releasable axial bearing surfaces which will be described below.

The releasable means comprise at least one arm 56, for example three arms 56 distributed angularly around the support 44. Each arm 56 is secured axially to a part of the support 44, for example the intake part 44A as in the first embodiment of the invention.

Thus, in the example illustrated in FIGS. 1 to 4, each arm 56 is made of metal and comprises one end articulated on the intake part 44A of the support and one free end in the form of a hook. This free end forms a stop delimiting an axial bearing surface B intended to engage with a stepped complementary stop which is made on the contour of the balancing part 44B and delimits two bearing surfaces B1, B2. These two latter bearing surfaces B1, B2, offset axially and radially, define two, respectively normal and elongated, lengths for the support 44.

The bearing surfaces B, B1, B2 constitute complementary axial bearing surfaces which, by being released, make it possible to change the length of the support between these normal and elongated values.

Release is brought about with the aid of means for releasing the complementary axial bearing surfaces B, B1, B2. These release means comprise, for example, a collar 58, fitted onto the plunger 20, bearing three fingers 60 projecting radially with respect to the contour of the plunger 20. Each arm 56 is assigned a release finger 60.

The release fingers 60, distributed angularly around the plunger 20, are intended to engage with the corresponding arms 56, against an elastic return force returning these arms 56 into a position of engagement between the complementary bearing surfaces B, B1, B2.

The release fingers 60 are thus intended to radially separate the complementary bearing surfaces B, B1 when the distance between the plunger 20 and the pneumatic piston 22 is reduced beyond a predetermined threshold.

It will be noted that each release finger 60 is intended to engage with a ramp 56R for the radial separation of the corresponding arm 56.

In the example illustrated in FIGS. 1 to 4, the ramp 56R is delimited by a fold of the arm 56.

The size of the ramps 56R is designed so that the radial separation of the complementary bearing surfaces B, B1, causing the release thereof, takes place only when the distance between the plunger 20 and the pneumatic piston 22 is reduced beyond the predetermined threshold.

In the first embodiment of the invention, the arms 56 are returned into a position of engagement between the complementary bearing surfaces B, B1, B2 by a wirelike ring 62 forming an elastically deformable member encircling the arms 56 in such a way as to engage with them.

A spring 64, working in compression, bears, on the one hand, on a seat integral with the plunger 20 and, on the other hand, on a seat integral with the support 44, for example with the balancing part 44B of this support, as in the example illustrated in FIGS. 1 to 4. This spring 64 forms elastic return means urging the plunger 20 and the support 44 away from one another, in such a way as to return this support 44 toward the piston assembly 22 and thus connect the support 44 elastically to the movement of the piston assembly 22.

The main aspects of the operation of the brake control device 10 which are connected with the invention will be stated below.

At rest, the brake control device 10 is in the configuration represented in FIG. 1. The plunger 20 bears against a rear wall of the enclosure 16 by way of the intake part 44A of the support. The means 27 for returning the piston assembly 22 into its rest position have the effect, on the one hand, of keeping compressed the spring 54 for separating the two parts 44A, 44B of the support and, on the other hand, of making the complementary elements of the intake valves VA1, VA2 and balancing valves VE1, VE2 cooperate with one another. These valves are therefore closed. The free ends of the arms 56, more specifically the bearing surfaces B of these arms, are kept at the same radial level at the bearing surfaces B1 (defining the normal length of the support 44) without thereby being in contact with these bearing surfaces B1.

Figure 3:
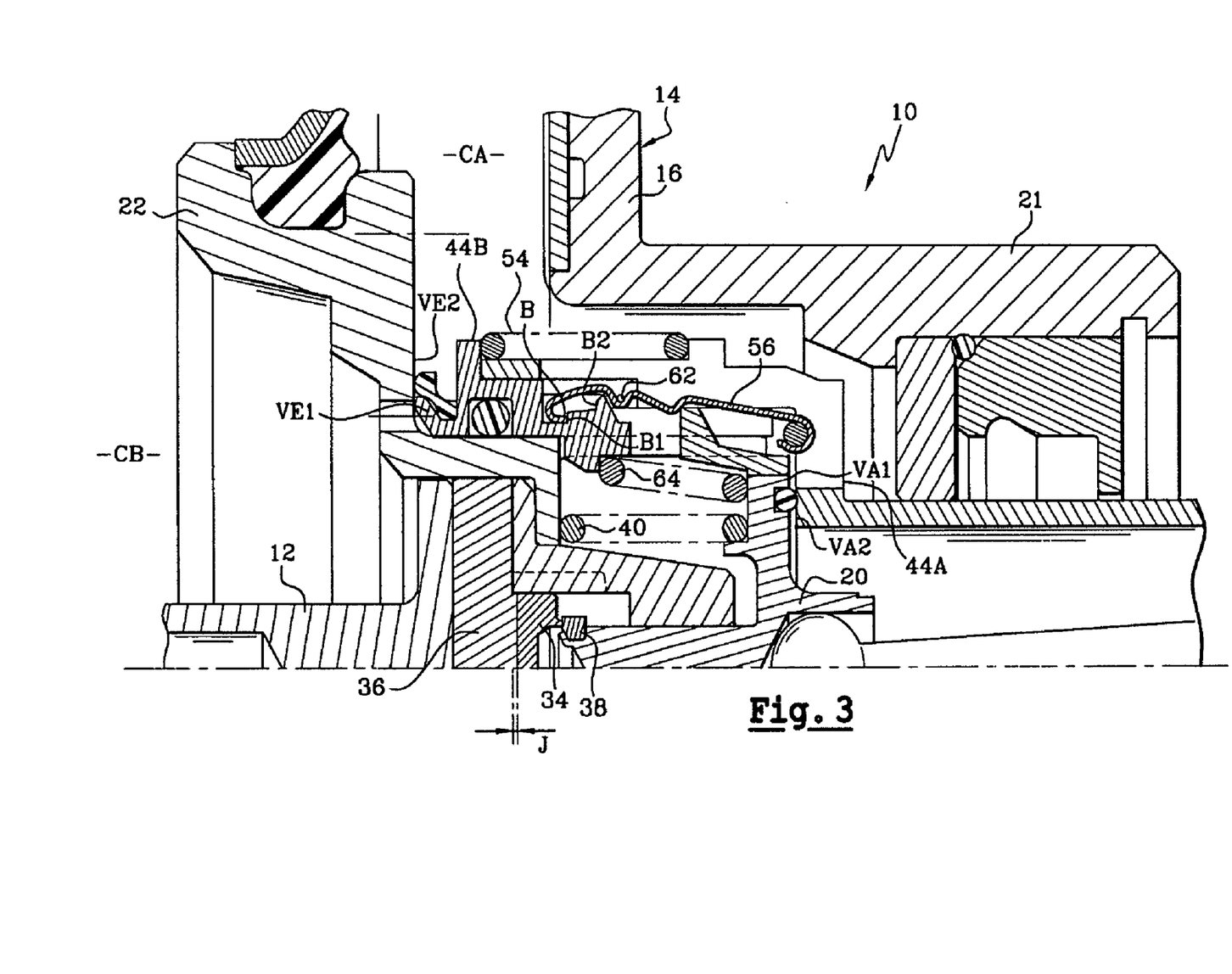
FIGS. 3 and 4 are views which are similar to that of FIG. 1, showing the brake control device in a normal braking configuration and an emergency braking configuration, respectively.

FIG. 3 represents the control device 10 in a configuration such that the plunger 20 is in equilibrium during a normal braking operation. The support 44, together with the piston assembly 22, has moved forward. The arms 56 engage with the bearing surfaces B1 so as to oppose the elastic force, imposed by the spring 54, separating the two parts 44A, 44B of the support.

Since the braking operation proceeds under normal conditions, the distance between the plunger 20 and the piston assembly 22 is not reduced beyond the predetermined threshold during the braking, with the result that the bearing surfaces B of the arms are not released from the bearing surfaces B1 of the balancing part 44B of the support (the relative movement between the release fingers 60 and the ramps 56R of the arms is not sufficient to cause this release).

The support 44 has a normal length corresponding to an axial clearance J which is capable of causing a normal pressure jump in the master cylinder when the user interrupts the equilibrium of the plunger 20 by increasing the power of the force applied to the brake pedal.

Figure 4:
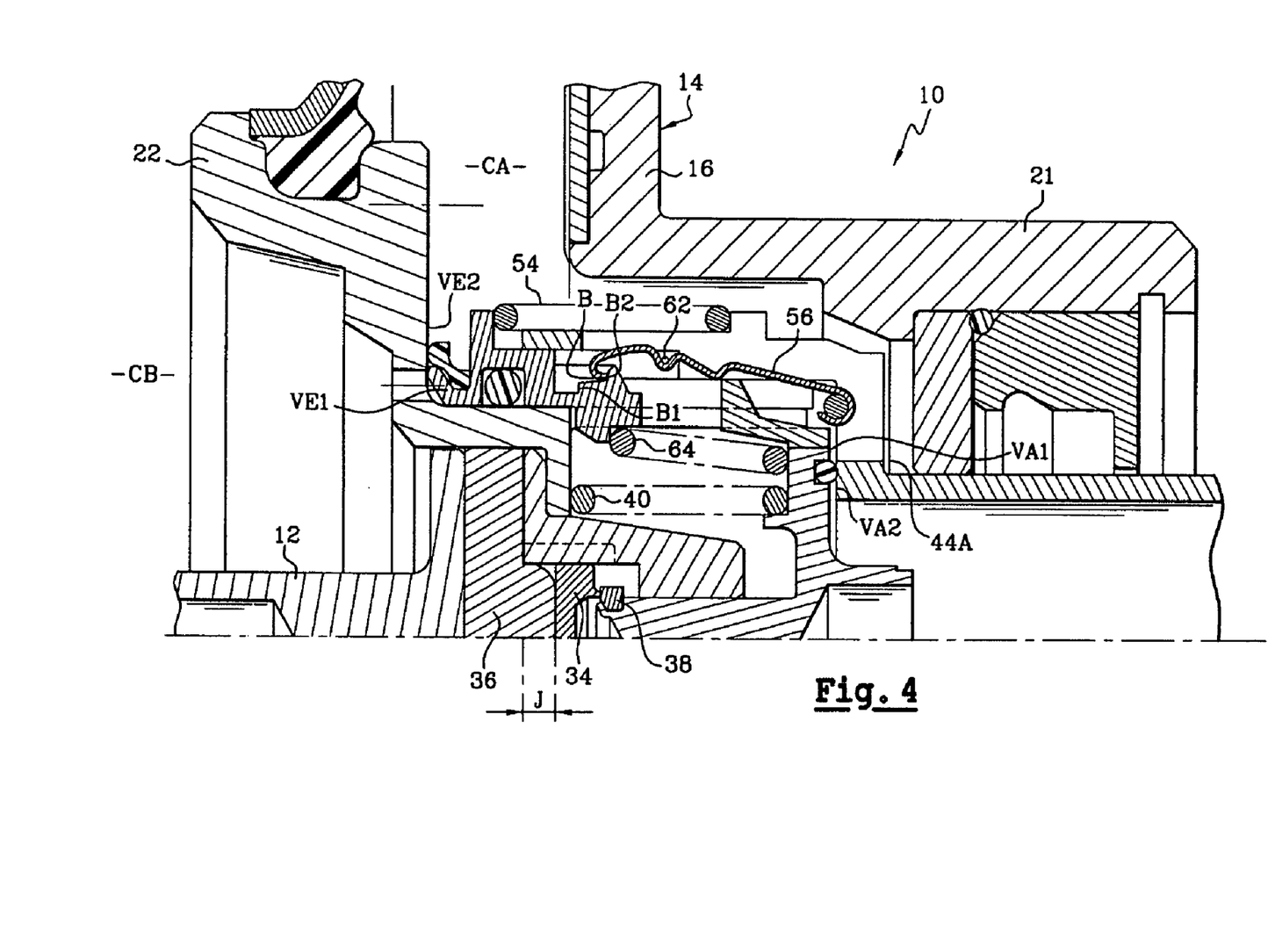

FIG. 4 represents the control device 10 in a configuration such that the plunger 20 is in a position of equilibrium during an emergency braking operation.

On account of the inertia of the piston assembly 22, the emergency braking (considerable force applied to the brake pedal) causes a relative coming-together of the plunger 20 and of this piston assembly 22 which is substantial enough for the distance between the plunger 20 and the piston assembly 22 to be reduced beyond the predetermined threshold. The engagement of the release fingers 60 with the ramps 56R of the arms, against the elastic force of the return member 62, causes the axial bearing surfaces B to be released radially outward. The bearing surfaces B then engage with the axial bearing surfaces B2 defining the elongated length of the support 24, this taking place after the spring 54 has forced the two parts 44A, 44B of the support to separate.

The arms 56, engaging with the bearing surfaces B2, limit the separation of the two parts 44A, 44B of the support by opposing the return force of the spring 54.

The support 44 has an elongated length imposing an axial clearance J which is greater than the clearance obtained under the normal braking conditions described above. When the user interrupts the equilibrium of the plunger 20 by increasing the power of the force applied to the brake pedal, this greater clearance J makes it possible to obtain a pressure jump in the master cylinder which is greater than that described above in the case of normal braking.

When the braking operation is interrupted (the user releases the brake pedal), the control device 10 returns to its rest configuration represented in FIG. 1, the two parts 44A, 44B of the support coming toward one another such that the elastic member 62 returns the bearing surfaces B of the arms 56 radially toward the bearing surfaces B1 of the balancing part of the support.

Figure 5:
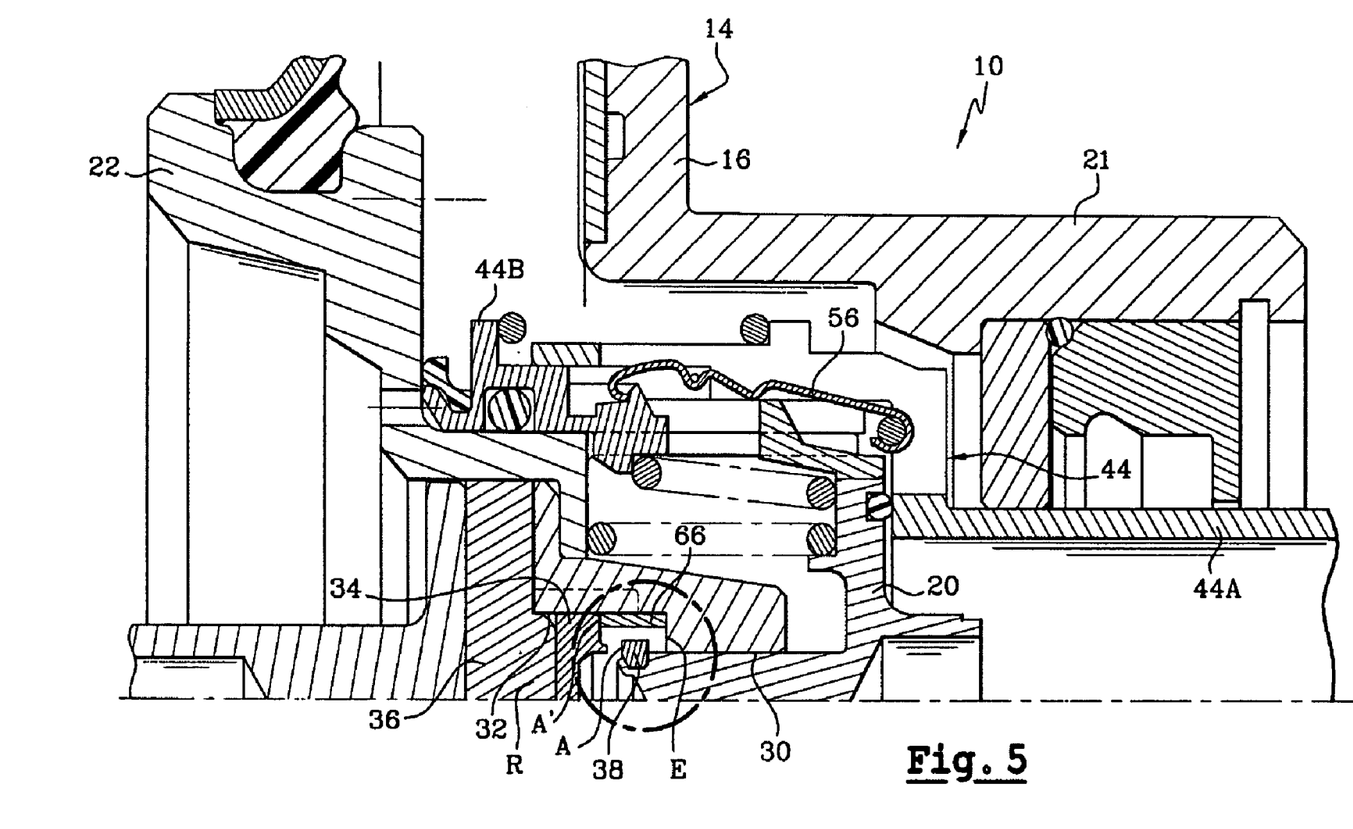
FIG. 5 is a view similar to that of FIG. 4 of a brake control device according to a second embodiment of the invention.
Figure 6:
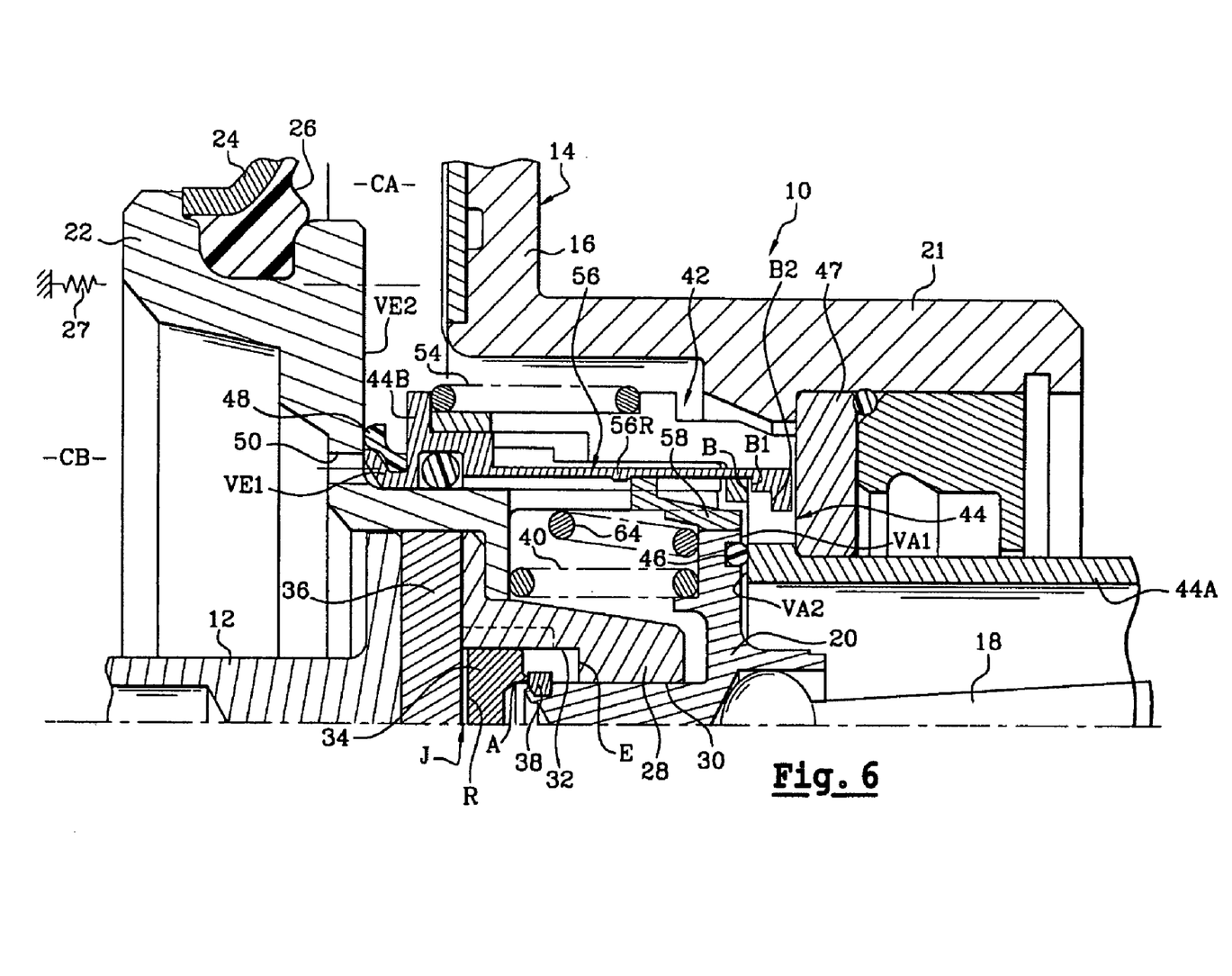
FIGS. 6 and 7 are views similar to FIGS. 1 and 2 of a brake control device according to a third embodiment of the invention.
Figure 7:
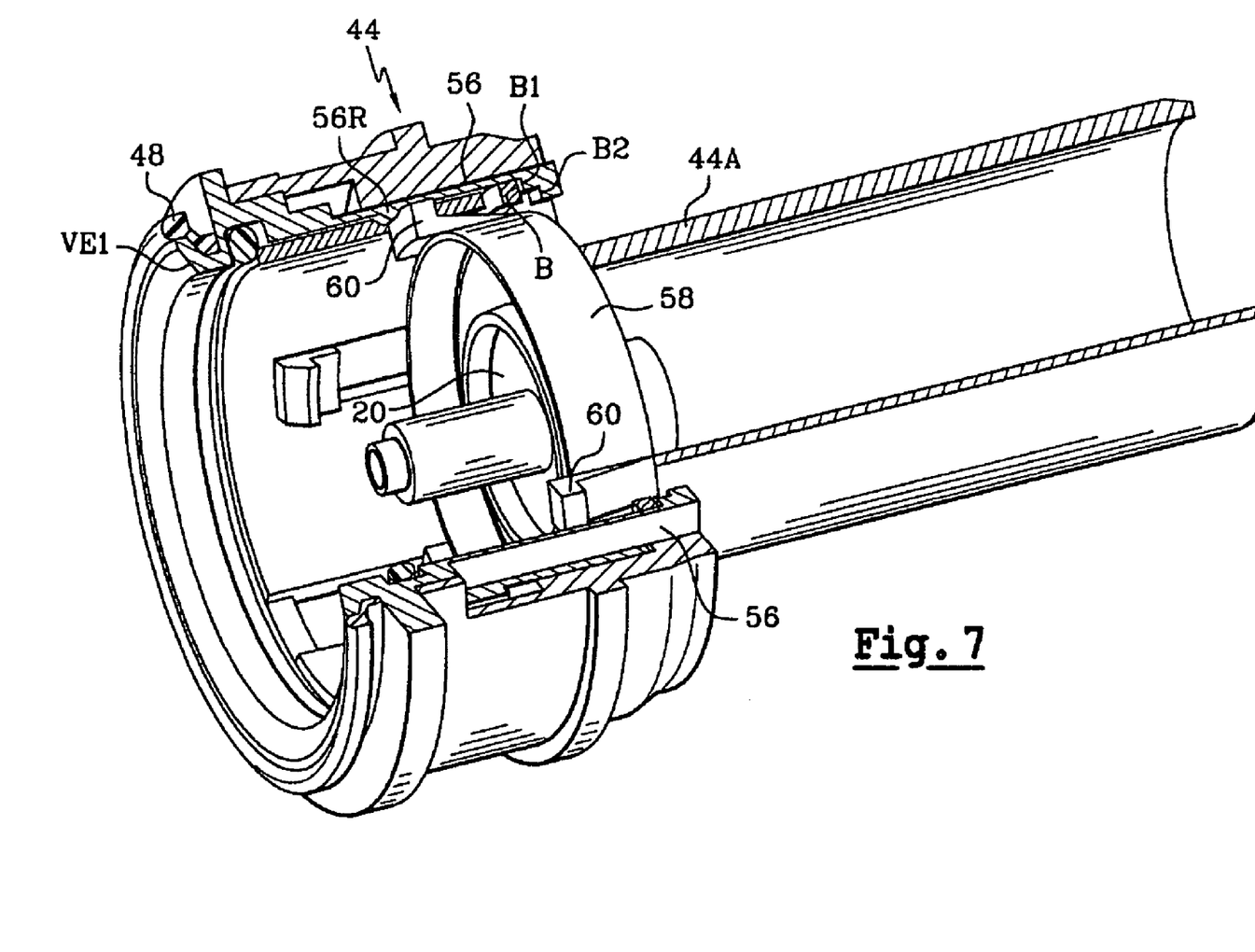

FIGS. 5 to 7 represent a brake control device 10 according to second and third embodiments of the invention. In these figures, those elements which are analogous to those in the preceding figures are denoted by identical references.

In the second embodiment of the invention represented in FIG. 5, the feeler 34 is inserted axially between the bearing face R delimiting the reaction disk 36 and a bearing face A' delimiting one end of a spacer sleeve 66 housed in the recess 32. The spacer sleeve 66 is inserted axially between the feeler 34 and the shoulder E separating the supporting surface 30 from the recess 32. It will be noted that the ring 38 is housed within the sleeve 66.

The spacer sleeve 66 makes it possible in certain cases, when this sleeve 66 is connected axially to the actuating rod 12, to return the reaction to which the actuating rod 12 has been subjected toward the piston assembly 22 instead of toward the plunger 20. The reason for this is that the feeler 34 bears on this spacer sleeve 66 instead of on the bearing ring 38 in certain operational configurations of the control device 10.

In the third embodiment of the invention represented in FIGS. 6 and 7, it can be seen that the arms 56 are secured axially to the balancing part 44B of the support, these arms 56 being formed integrally with this part 44B. The complementary axial bearing surfaces B, B1, B2 are borne by the intake part 44A of the support and the free ends of the arms 56.

The intake part 44A of the support bears stops each delimiting the axial bearing surface B intended to engage with a corresponding arm 56. Specifically, the free end of each arm 56 bears a stepped complementary stop forming the two axially and radially offset bearing surfaces B1, B2 corresponding to the two, respectively normal and elongated, lengths of the support 44.

It will be noted that, in the third embodiment of the invention, the arms 56 are returned into a position of engagement between the complementary bearing surfaces B, B1, B2 by elastic deformation of these arms. The arms 56 and the support 44 are advantageously made of plastic.

The operation of the control device 10 according to the third embodiment of the invention is analogous, mutatis mutandis, to the operation of the device 10 according to the first and second embodiments of the invention.

Among the advantages of the invention, it will be noted that this invention makes it possible, by virtue of an automatic adjustment of the length of the support 44, to bring about a pressure jump in the master cylinder which is more pronounced in the event of emergency braking than in the event of normal braking.

What is claimed is:

1. A pneumatic brake booster (14) comprising:
   an axially movable control member (20) for controlling this booster and receiving a control force applied by a user;
   a pneumatic enclosure (16) having a rear chamber (CA) separated from a front chamber (CB) by a pneumatic piston (22); and
   means for forming pneumatic valves comprising:
      first (VE1) and second (VE2) complementary balancing valve elements for placing the rear chamber (CA) in communication with the front chamber (CB), and
      first (VA1) and second (VA2) complementary intake valve elements for placing the rear chamber (CA) in communication with a pneumatic pressure source,
   characterized in that:
   said means for forming pneumatic valves comprise an axially floating tubular support (44) provided with an intake part (44A) and a balancing part (44B) that move axially with respect to one another to adjust the length of said tubular support (44);
   the first (VE1) and second (VE2) balancing valve elements are borne respectively by balancing part (44B) of said tubular support (44) and the pneumatic piston (22);
   the first (VA1) and second (VA2) intake valve elements being borne respectively by the control member (20) and the intake part (44A) of said tubular support (44); and
   the balancing part (44B) and intake part (44A) of the tubular support (44) are connected to one another by means (52) for adjusting the axial separation thereof as a function of the power of the force applied to the control member (20).

2. The booster according to claim 1, characterized in that means (52) for adjusting the axial separation comprise:
   elastic return means (54) urging the balancing part (44B) and intake part (44A) of the support (44) away from one another, and
   means (56) having releasable axial bearing surfaces, comprising:
      complementary axial bearing surfaces (B, B1, B2) borne by one of either the intake part (44A) or the balancing part (44B) of the support and a free end of at least one arm (56) secured axially to the other of the intake part (44A) or the balancing part (44B), and
      means (60) for releasing the complementary axial bearing surfaces (B, B1, B2), borne by the control member (20), said means (60) for releasing engaging with the arm (56), against an elastic force for returning said arm (56) into a position of engagement between the complementary bearing surfaces (B, B1, B2), in order to radially separate the complementary bearing surfaces (B, B1) when a distance between the control member (20) and the pneumatic piston (22) is reduced beyond a predetermined threshold.

3. The booster according to claim 2, characterized in that the control member (20) has a general shape of revolution, and the means for releasing the complementary axial bearing surfaces (B, B1, B2) comprising at least one finger (60) projecting radially with respect to the contour of the control member (20).

4. The booster according to claim 3, characterized in that said release finger (60) engages with a ramp (56R) for the radial separation of the arm (56) with the size of this ramp (56R) being designed so that the radial separation of the complementary bearing surfaces (B, B1) causes the release thereof and takes place only when the distance between the control member (20) and the pneumatic piston (22) is reduced beyond the predetermined threshold.

5. The booster according to claim 4, characterized in that the arm (56) is secured axially to the intake part (44A) of the support with the complementary axial bearing surfaces (B, B1, B2) being borne by the arm (56) and the balancing part (44B) of the support.

6. The booster according to claim 5, characterized in that the free end of the arm (56) has a general hook shape forming an axial bearing stop (B) that engages with a stepped complementary stop borne by the balancing part (44B), this stepped stop forming two axially and radially offset bearing surfaces (B1, B2) corresponding to two, respectively normal and elongated, lengths of the support (44).

7. The booster according to claim 4, further characterized by at least three releasable arms (56) and three release fingers (60) distributed angularly around the support (44) and the control member (20) respectively.

8. The booster according to claim 5, characterized in that the arm (56) is secured axially to the balancing part (44B) of the support with the complementary axial bearing surfaces (B, B1, B2) being borne by the arm (56) and the intake part (44A) of the support.

9. The booster according to claim 8, characterized in that the intake part (44A) of the support has an axial bearing stop (B) that engages with a stepped complementary stop borne by the free end of the arm (56), said stepped stop (B) forming two axially and radially offset bearing surfaces (B1, B2) corresponding to two, respectively normal and elongated, lengths of the support (44).

10. The booster according to claim 9, characterized in that the arm (56) is returned into a position of engagement between the complementary bearing surfaces (B, B1, B2) by an elastically deformable member (62) engaging with arm (56).

11. The booster according to claim 9, characterized in that the arm (56) is returned into a position of engagement between the complementary bearing surfaces (B, B1, B2) by elastic deformation of arm (56).

12. The booster according to claim 11, characterized in that it comprises elastic return means (64) for urging the control member (20) and the support (44) away from one another in such a way as to return the support (44) toward the piston (22) and connect support (44) elastically to movements of the piston (22).

13. The booster according to claim 12, further characterized by elastic return means (40) for urging the control member (20) and the pneumatic piston (22) away from one another, in such a way as to return the control member (20) toward a rest position.

14. The booster according to claim 13, further characterized by a feeler (34) for the transmission of force between the control member (20) and a master cylinder actuating rod (12), said feeler (34) being inserted axially between first (R) and second (A') bearing faces to be connected axially to the actuating rod (12), and the first bearing face (R) to be connected to the actuating rod (12) and a bearing face (A) connected axially to the control member (20).

15. The booster according to claim 14, characterized in that with the first bearing face (R) connected to the actuating rod (12) delimits a reaction disk (36) which is elastically deformable axially and connected axially to the actuating rod (12).

16. The booster according to claim 15, characterized in that a second bearing face (A') is connected to the actuating rod (12) to delimit one end of a spacer sleeve (66) borne by a member (28) for axially guiding the control member (20) and said bearing face (A) is connected axially to the control member (20) to delimit a bearing ring (38) housed within the bearing sleeve (66).

17. The booster according to claim 1, characterized in that the pneumatic pressure source is atmospheric air.

* * * * *